(12) United States Patent
Dragulescu et al.

(10) Patent No.: US 9,001,688 B2
(45) Date of Patent: Apr. 7, 2015

(54) DYNAMIC BALANCING OF A TRAFFIC MIX FOR DATA CENTER DEVICE TESTING

(71) Applicant: Ixia, Calabasas, CA (US)

(72) Inventors: Alexandru George Dragulescu, Bucharest (RO); Toshal Dudhwala, Calabasas, CA (US); Clifford Tavares, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 74 days.

(21) Appl. No.: 13/962,666

(22) Filed: Aug. 8, 2013

(65) Prior Publication Data

US 2014/0160961 A1   Jun. 12, 2014

Related U.S. Application Data

(60) Provisional application No. 61/682,079, filed on Aug. 10, 2012.

(51) Int. Cl.
*H04L 12/801* (2013.01)
*H04L 12/26* (2006.01)

(52) U.S. Cl.
CPC ............ *H04L 47/11* (2013.01); *H04L 43/0894* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2003/0012141 A1* | 1/2003 | Gerrevink | 370/250 |
| 2003/0172177 A1* | 9/2003 | Kersley et al. | 709/236 |

* cited by examiner

*Primary Examiner* — Hong Cho
(74) *Attorney, Agent, or Firm* — SoCal IP Law Group LLP; M. Kala Sarvaiya; Steven C. Sereboff

(57) ABSTRACT

There is disclosed a method for testing a network device comprising defining a traffic profile wherein the traffic profile defines a type of network traffic comprising a sequence of packets and wherein the traffic profile associates the network traffic with a communication axis. The method also comprises defining a traffic template wherein the traffic template comprises one or more traffic profiles, a relative weight to identify a weight of the profile within an overall traffic configuration, and a load rate that defines the maximum amount of packets that can be transmitted at a certain time. The method further comprises generating network traffic based on the traffic template, and transmitting the network traffic to a device under test wherein the relative weight of the traffic profile may be changed dynamically in real-time.

8 Claims, 10 Drawing Sheets

DYNAMIC BALANCING OF A TRAFFIC MIX FOR DATA CENTER DEVICE TESTING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to defining realistic test configurations and test methods that can be dynamically updated while testing a network device.

2. Description of the Related Art

There exists a difficulty in communications networks in creating realistic traffic loads to test a datacenter device. Such a scenario requires the capability to actively vary the load of traffic, either the overall load or individually change the amount of traffic of a certain type. Specifically, the overall load for a device can vary on a certain direction—either client to server or server to server—or the amount of traffic of a certain type may vary—i.e. if initially the server to server traffic that passes through a device was composed of 10% iSCSI traffic and the rest was MS Exchange traffic, that may change very quickly to 50% iSCSI and 50% MS Exchange or other). In addition to that there is always the issue of the testing values range, which can be unknown at the beginning of the testing procedure.

In many types of communications networks, each message to be sent is divided into portions of fixed or variable length. Each portion may be referred to as a packet, a frame, a cell, a datagram, a data unit, or other unit of information, all of which are referred to herein as packets. Packets that are communicated over a network are referred to herein as network traffic. The network traffic may include packets that represent electronic mail messages, streaming media such as music (audio) and video, telephone (voice) conversations, web pages, graphics, documents, and others.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1, or physical layer, protocols define the physical (electrical, optical, or wireless) media between nodes of the network and the rules and processes used to access that media. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7, or application layer, protocols include the HyperText Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "device under test" (DUT) encompasses one or more network devices within a packet switched communications network. In order to test a DUT, test traffic comprising a large number of packets may be generated and transmitted to and/or through the DUT at one or more ports. Return test traffic transmitted through and/or from the DUT may be received at different ports. In this context, the term "port" refers to a logical entity coupled to the DUT by a communications path. The term "port unit" refers to a module within the network test equipment that connects to the DUT at a port. Thus a "port" encompasses a physical "port unit" and the data and parameters that define and constraint the operation of the port unit during a test session. Each port connected to the DUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a DUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant.

When the DUT operates at a higher layer of the network structure (for example, when the DUT is or includes a server, a server load balancer, a firewall, a network security device that performs packet inspection, or similar network devices), the test traffic may include or be a large plurality of TCP connections of a larger number of application layer transactions (e.g. HTTP GET transactions).

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
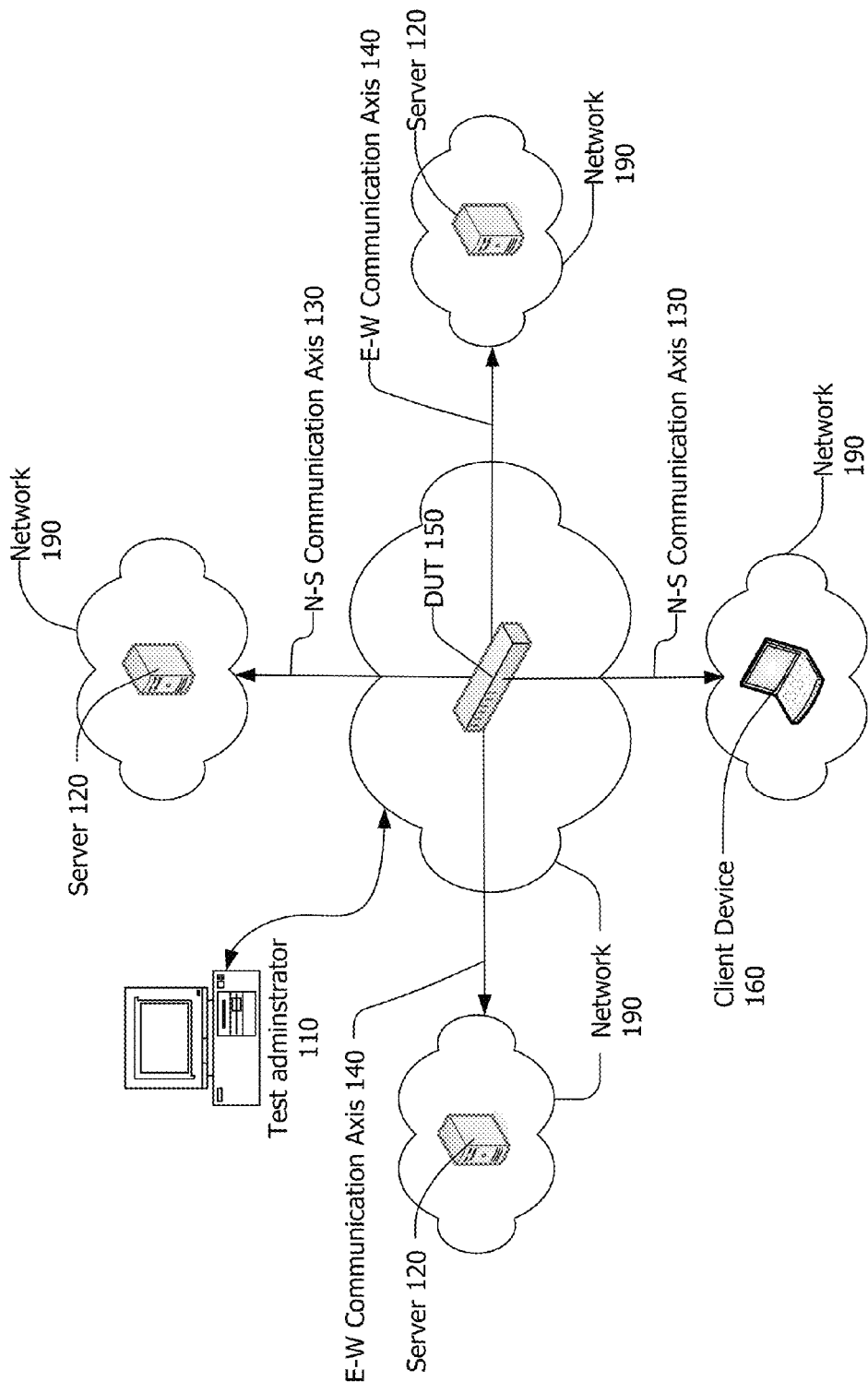
FIG. 1 is a block diagram of a network environment.

FIG. 1 shows a block diagram of a network environment for testing a datacenter device. The environment may include a test administrator 110, servers 120, a device under test 150, a client device 160 and a network 190. For ease of description, the DUT 150 of FIG. 1 is coupled to a single client device and three servers. The DUT in an actual testing environment may be connected to a large number of emulated client devices and more than three servers.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets.

Various types of network traffic may be generated to emulate realistic traffic load conditions on the network environment. The first step in generating network traffic is to define the network traffic that is to be tested. For testing data center devices, the network traffic can be classified in two categories. The first category is client to server network traffic. For ease of description, client to server traffic will be called "North to South" network traffic. The communication path that the North to South network traffic travels on is called the North to South (N-S) communication axis 130. The term "North to South" does not imply any geographic direction of the traffic, but simply reflects that the N-S axis is shown vertically in the figures. The side of the axis with the server, for example server 120 of FIG. 1, is known as the North side and the client side, for example, client device 160 of FIG. 1, of the axis is the South side. Either the client or the server can initiate the request that creates the network traffic.

Examples of North to South network traffic include audio and video streams, such as Pandora and Youtube, email messages and Web browsing data. This traffic may be comprised of numerous control and data plane protocols including, but not limited, HTTP, SIP, RTSP, IMAP4, and POP3.

The second category of network traffic is internal traffic within the data center. This is called East to West network traffic. The communication path that the network traffic travels on is called the East to West (E-S) communication axis 140.

Examples of East to West network traffic include traffic associated with server to server communications, such as application server to database server communications, and cloud-hosted storage communication traffic. The East to West network traffic may be comprised of numerous control and data plane protocols including, but not limited to iSCSI and HTTP.

Figure 2:
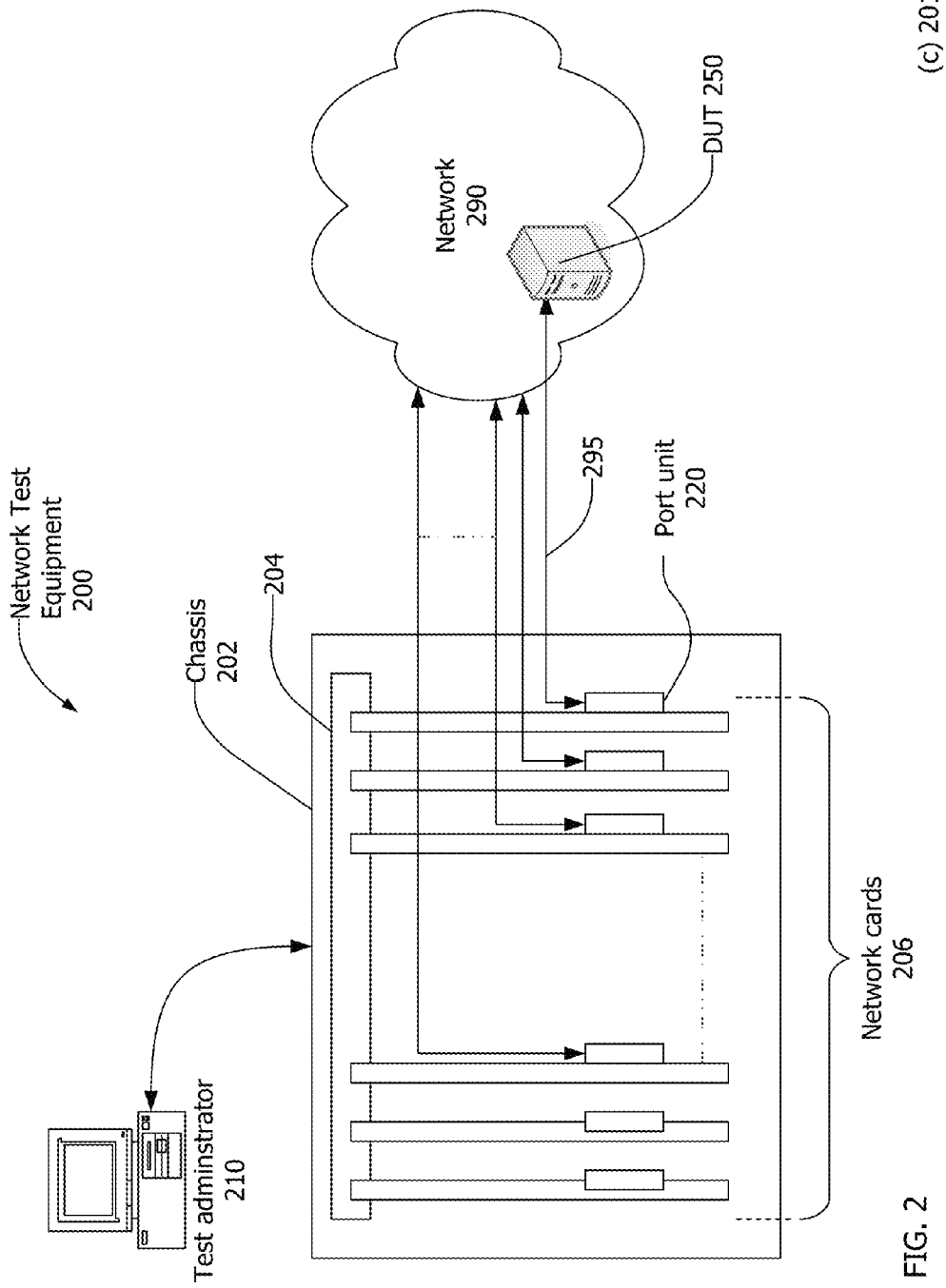
FIG. 2 is a block diagram of a test system.

FIG. 2 shows a block diagram of a network environment. The environment may include network test equipment 200 and a network 290 which includes one or more devices under test (DUT) 250. The DUT 250 may be any device capable of communicating over the network 290.

The network test equipment 200 may be a network testing device, performance analyzer, conformance validation system, network analyzer, or network management system. The network test equipment 200 may include one or more network cards 206 and a backplane 204 contained or enclosed within a chassis 202. The chassis 202 may be a fixed or portable chassis, cabinet, or enclosure suitable to contain the network test equipment. The network test equipment 200 may be an integrated unit, as shown in FIG. 2. Alternatively, the network test equipment 200 may comprise a number of separate units cooperative to provide traffic generation and/or analysis. The network test equipment 200 and the network cards 206 may support one or more well known standards or protocols such as the various Ethernet and Fibre Channel standards, and may support proprietary protocols as well.

The network cards 206 may include one or more field programmable gate arrays (FPGAs), application specific integrated circuits (ASICs), programmable logic devices (PLDs), programmable logic arrays (PLAs), processors, and other kinds of devices. In addition, the network cards 206 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 206 may support a single communications protocol, may support a number of related protocols, or may support a number of unrelated protocols. One or more network cards 206 or their equivalent may be permanently installed in a self-contained test unit or tests appliance.

Each network card 206 may contain one or more port unit 220. Each port unit 220 may include circuits and software to generate test traffic and/or to receive and analyze test traffic. Each port unit may be coupled to the test administrator 205. Each port unit 220 may connect to the network 290 through one or more ports. Each port unit 220 may be connected to the network 290 through a communication medium 295, which may be a wire, an optical fiber, a wireless link, or other communication medium. Each port unit 220 refers to a module within the network test equipment that connects to the DUT 250 at a port along either the N-S communication axis or the E-W communication axis. Each port unit 220 connected to the DUT may be both a source of test traffic and a destination for test traffic. Each port unit 220 may emulate a plurality of logical source or destination addresses. Each port unit 220 may emulate a plurality of network users, clients, peers, servers, or other network devices.

The backplane 204 may serve as a bus or communications medium for the network cards 206. The backplane 204 may also provide power to the network cards 206.

The network test equipment 200 may also include a test administrator 210, which is similar to the test administrator 110 of FIG. 1. The test administrator 210 may be a computing device included within or coupled to the chassis 202. The test administrator 210 may include an operator interface (not shown) that may be used to plan a test session, to control the test session, and/or to view test results during and after the test session. The operator interface may include, for example, a display and a keyboard, mouse, and/or other input devices (not shown). The test administrator 210 may include or be coupled to a printer or other data output device (not shown) for output of test results. The test administrator 210 may include or be coupled to a storage device (not shown) for storing test data and results for future review and/or analysis.

The network traffic on network 290 and produced and received by various nodes, including the ports on the network cards 206 includes both control plane traffic and data plane traffic. The control plane and data plane are virtualizations that are useful in conceptualizing the roles of two kinds of network traffic. Control plane traffic includes packets that implement the various supported communications protocols, including administrative communications among nodes to maintain communications among the nodes. An example of control plane traffic are routing notices or packets informing a second node that a first node is inaccessible. Data plane traffic includes packets carrying data between nodes. The data plane carries network traffic that communicates data over a network. For example, those packets that carry data for an audio stream are considered to be communicated over the data plane and are considered data plane traffic.

Figure 3:
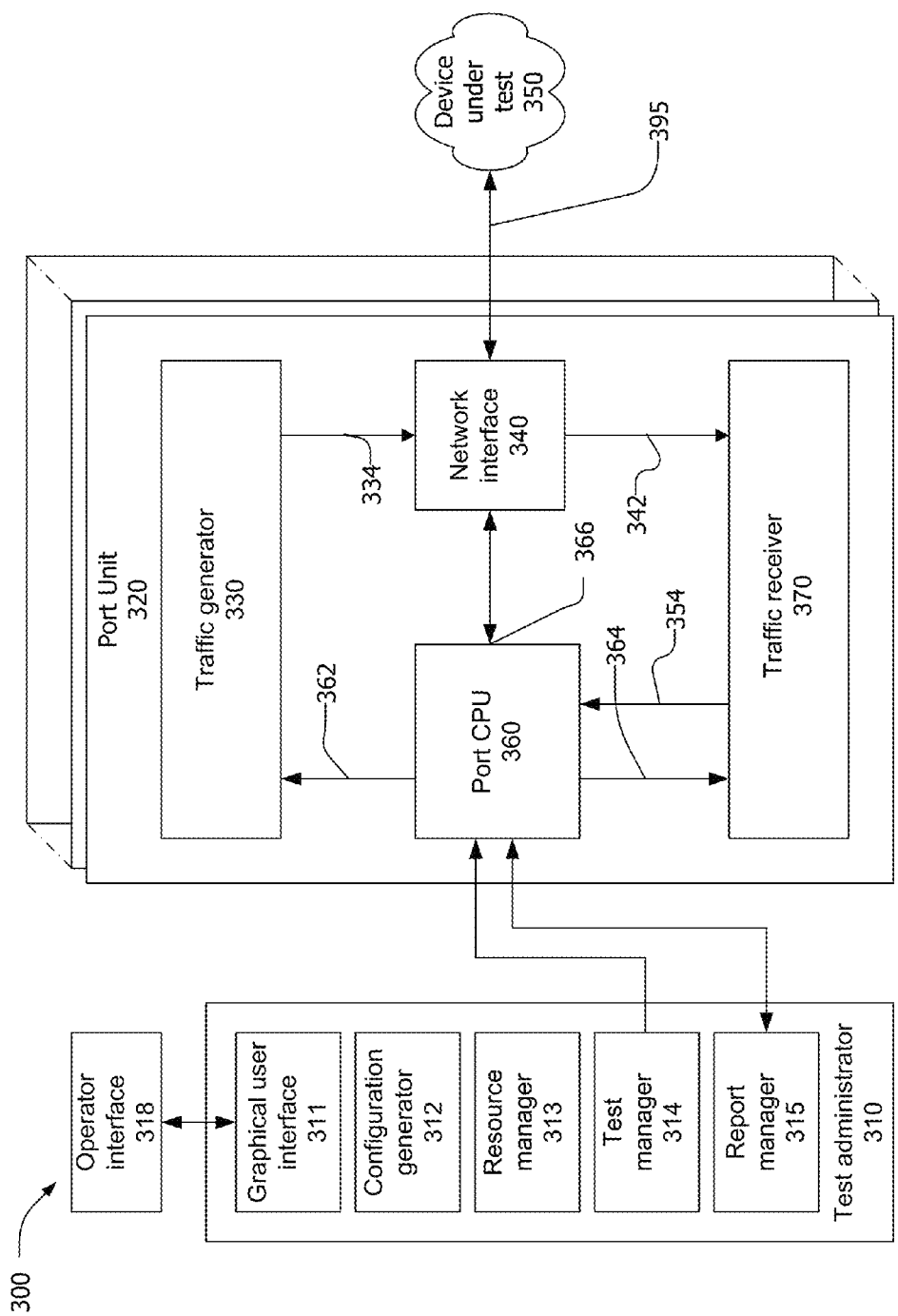
FIG. 3 is a block diagram of a computing device.

Referring now to FIG. 3, a test system 300, which may be the network test equipment 300 may include a test administrator 310 coupled to a plurality of port units including an exemplary port unit 320. The port unit 320 may include a port central processor unit 360 (CPU), a traffic generator unit 330, a traffic receiver unit 370, and a network interface unit 340 which couples the port unit 320 to a device under test 350. The port unit 320 may be all or part of a network card such as the network cards 206.

The port CPU 360 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 360 may provide the traffic generator unit 330 with stream forming data 362 to form a plurality of streams. The stream forming data 362 may include, for example, the type of packet, the frequency of transmission, definitions of fixed and variable-content fields within the packet and other information for each packet stream. The traffic generator unit 330 may then generate the plurality of streams in accordance with the stream forming data 362. The plurality of streams may be interleaved to form outgoing traffic 334. Each of the streams may include a sequence of packets. The packets within each stream may be of the same general type but may vary in length and content.

The network interface unit 340 may convert the outgoing traffic 334 from the traffic generator unit 330 into the electrical, optical, or wireless signal format required to transmit the test traffic to the device under test 350 via a link 395. The link 395 may be a wire, an optical fiber, a wireless link, or other communication link. Similarly, the network interface unit 340 may receive electrical, optical, or wireless signals from the network over the link 395 and may convert the received signals into incoming traffic 342 in a format usable to the traffic receiver unit 350.

The traffic receiver unit 370 may receive the incoming traffic 342 from the network interface unit 340. The traffic receiver unit 370 may determine if each received packet is a member of a specific flow, and may accumulate test statistics for each flow in accordance with test instructions 364 provided by the port CPU 360. The accumulated test statistics may include, for example, a total number of received packets, a number of packets received out-of-sequence, a number of received packets with errors, a maximum, average, and minimum propagation delay, and other statistics for each flow. The traffic receiver unit 370 may also capture and store specific packets in accordance with capture criteria included in the test instructions 364. The traffic receiver unit 370 may provide test statistics and/or captured packets 354 to the port CPU 360, in accordance with the test instructions 364, for additional analysis during, or subsequent to, the test session.

Some amount of interactive communications may be required between the port unit 320 and the device under test 350 during a test session. The interactive communications may include, for example, control plane traffic, TCP connections and application-layer transactions. Such traffic may be initiated, managed, and processed by the port CPU 360 and thus may be referred to as "CPU traffic". As shown in FIG. 3, the port CPU 360 may be coupled to the network interface unit 340 such that CPU traffic 366 may be communicated between the port CPU 360 and the device under test 350 via the network interface unit 340. Although not shown in FIG. 3, outgoing CPU traffic may be routed from the Port CPU 360 to the network interface unit 340 via the traffic generator unit 330, and incoming CPU traffic may be routed from the network interface unit to the port CPU via the traffic receiver unit 350.

The port CPU 360 may communicate with a test administrator 310, which in turn may communicate with or include an operator interface 318. The test administrator 310 may be a computing device connected to the port unit 320 via a bus, a network, or another communications path. The operator interface 318 may include at least one display device and one or more input devices such as a keyboard, a mouse or other pointing device, and/or a touch screen.

The hardware and software of the test administrator 310 may perform multiple functions including a graphical user interface 311, a configuration generator 312, a resource manager 313, a test manager 314, and a report manager 315. The configuration generator 312 may develop a test configuration based, at least in part, on instructions and data received from a test engineer or other operator via the graphical user interface 311 and the operator interface 318. The resource manager may manage a catalog of test configuration resources stored in a configuration library (not shown). Each stored test configuration resource may be a reusable fragment of a test configuration. The test manager 314 may provide the port CPU 360 of each port unit 320 with instructions, parameters, and data required for each port unit to participate in testing the device under test 350 in accordance with the test configuration generated by the configuration generator 312. The instructions and data provided by the test manager 316 to each port unit 320 may include, for example, data enabling or disabling various capabilities and protocols, operational parameters, definitions of packet streams to be generated by the port unit and definitions of performance statistics to be accumulated by the port unit. The report manager 315 may request interim and final test statistics and other test data from each port unit 320, format the test data into reports, and present the reports to the operator via the graphical user interface 311 and the operator interface 318.

Description of Processes

Figure 4:
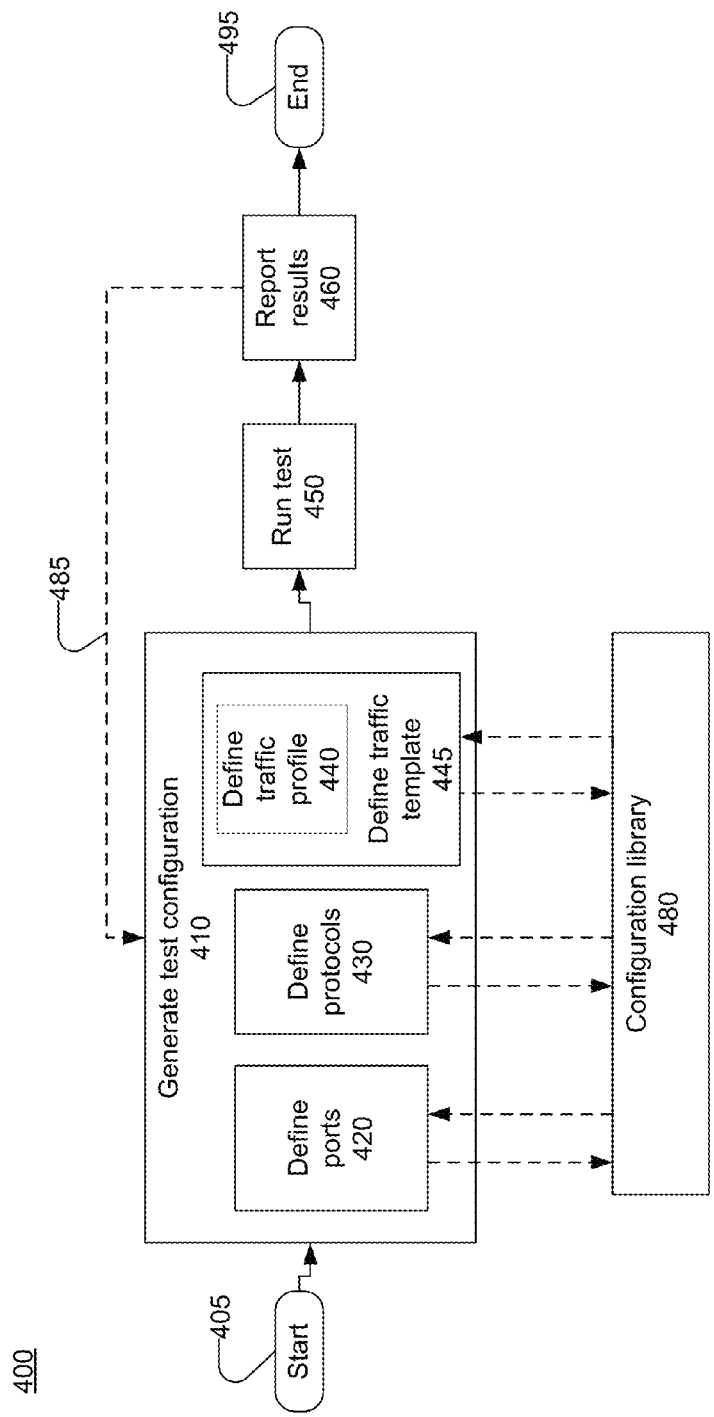
FIG. 4 is a flow chart for dynamically loading traffic on a network device.

Referring now to FIG. 4, a process 400 for generating network traffic for testing a DUT may start at 405 and finish at 495. The process 400 may be executed within a test environment such as that shown in FIG. 2. The process 400 may be performed using a test administrator 210 in conjunction with a plurality of port units 220. The process 400 may be used to test a device under test such as DUT 250.

The test traffic and the data used to define the test traffic may depend on the type of traffic and the configuration of the traffic to be tested. For example, traffic on a client to server, or N-S, communication path may comprise web browsing traffic, YouTube video traffic, and Pandora audio traffic. Similarly, traffic on a server to server, or E-W, communication path may comprise application server to database server traffic. As such, the test traffic and data used is dependent on the type of traffic and the configuration of the traffic. The process 400 may include generating a test configuration at 410, running a test session according to the test configuration at 450, and reporting test results at 460. For ease of description, these actions are shown to be sequential in FIG. 4. However, these actions may be performed, to at least some extent, concurrently. For example, interim test results may be reported at 460 while a test session is still running at 450. Further, the process 400 may be, to at least some extent, cyclic. For example, interim test results reported at 460 may be used to modify the test configuration, either automatically or as a result of some user action, as indicated by dashed line 485.

Generating a test configuration at 410 may include, at 420, defining a plurality of ports to be used to test the DUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data. For example, the hardware may be identified by a model or part number of a line card and a chassis. The physical layer protocol may be an Ethernet protocol, ATM (asynchronous transfer mode, PoS (packet over Synchronous Optical Networking/Synchronous Digital Hierarchy), Fibre Channel, or some other physical layer protocol. Parameters included in the port attributes may include, for example, a physical layer address for the port, a data rate or interface type, a selection of a cyclic redundancy code (e.g. 16-bit or 32-bit), and parameters defining whether or not optional features (e.g. flow control, data scrambling, auto negotiation of data rates, etc.) are enabled.

A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration at 410 may include, at 430, defining a layer 2/3 protocol suite which is a subset of the available protocols that will be active at each port. Defining the layer 2/3 protocol suite may include identifying layer 2 and layer 3 protocols to be usable at each port and defining all protocol attributes to be used by the ports. The term "protocol attributes" includes all parameters and data necessary for the use of the identified protocols. Many, but not all, protocols require one or more attribute to be defined. A common example of a protocol attribute is an IPv4 or IPv6 address.

Each protocol suite may include at least one layer 2 media access protocol consistent with the physical layer protocol of the corresponding port. For example, a layer 2/3 protocol suite for an Ethernet port may include the Ethernet media access protocol, and the protocol suite for an ATM port may include the ATM media access protocol.

When a port is connected to the network, the port must announce its presence and distribute its address to the other nodes of the network. Thus the layer 2/3 protocol suite for each port will typically include at least one routing protocol such as BGP (border gateway protocol) or OPSF (open shortest path first). The layer 2/3 protocol suite for each port will typically also include at least one layer 3 communications protocol, such as IPv4 (Internet Protocol version 4) for exchanging data units with other nodes of the network.

Generating a test configuration at 410 may also include, at 440, defining the traffic profile 440. The traffic profile 440 defines the rules and parameters required to generate a sequence of packets that emulate a certain type of traffic. The traffic profile 440 may also associate the type of traffic with a communication axis. For example, two or more port units may be tasked to emulate web browsing traffic. For instance, a first port unit may be tasked to emulate a large plurality of web browsing clients and may generate client to server traffic on a North to South communication axis. A second port unit may be tasked to emulate one or more web servers responding to clients and may generate server traffic on the North to South communications. The traffic on the North to South axis may be stateless, which is to say that TCP connections may not be made between the first and second port units.

A web browsing traffic profile would contain the rules and parameters required to generate a sequence of packets that emulate one or more web browsing transactions on a North to South communication axis. The emulated traffic may be HTTP traffic. Other types of traffic on a North to South communication axis include YouTube video traffic, Pandora audio traffic and sending and receiving email message traffic. The YouTube video streaming traffic profile would contain the rules and parameters required to generate a sequence of packets that emulate one or more YouTube video streaming transactions or sessions. The emulated traffic may include HTTP and RTSP traffic. The North to South traffic may be comprised of numerous control and data plane protocols including, but not limited to HTTP, SIP, RTSP, IMAP4, POP3 and similar client to server transmission protocols.

Similarly, a port unit may be tasked to emulate server to server traffic, or East to West traffic. Examples of East to West network traffic include traffic associated with server to server communications, such as application server to database server communications, and cloud-hosted storage communication traffic. The East to West network traffic may be comprised of numerous control and data plane protocols including, but not limited to iSCSI and HTTP.

Once the communication service axis is defined and the traffic profile is defined, a user can then define a traffic template, as in 445 of FIG. 4. A traffic template comprises one or more traffic profiles and a relative weight that dictates how to apply the traffic profile on the network. Alternatively, the user can select a traffic template from a preloaded set of traffic templates. The traffic templates also generally associate a traffic profile to a communication axis.

Alternatively, the traffic template may comprise traffic profiles based on previously recorded live control plane and data plane traffic. For example, a user may record live traffic that is observed on the network. In recording the live traffic, the set of packets that are transmitted and received on the communication axis will be recorded. The user can then create traffic profiles based on the recorded traffic which comprises a set of packets. The traffic profiles that were created based on the recorded traffic may then be used in a traffic template.

While generating the test configuration at 410, one or more portion of the test configuration may be stored in, or retrieved from, a configuration library 480. For example, the configuration library may store predefined traffic templates. A "configuration library" is any memory storing one or more portions of a test configuration in retrievable form. Configuration resources stored in the configuration library 480 may include port resources, protocol resources, and traffic resources including previously created traffic profiles and traffic templates.

At 450, a test is run according to the test configuration defined in 410. As the test is running, a user can manually modify various traffic parameters in real-time. For example, the user can modify the mix of profiles involved in the test traffic. The user can also disable certain traffic types. In addition, the overall value of the load being sent from specific resources can be altered after the test has started running. Finally, the relative weight assigned to a traffic profile thereby changing the characteristic of the traffic sent on a communication axis.

Figure 5:
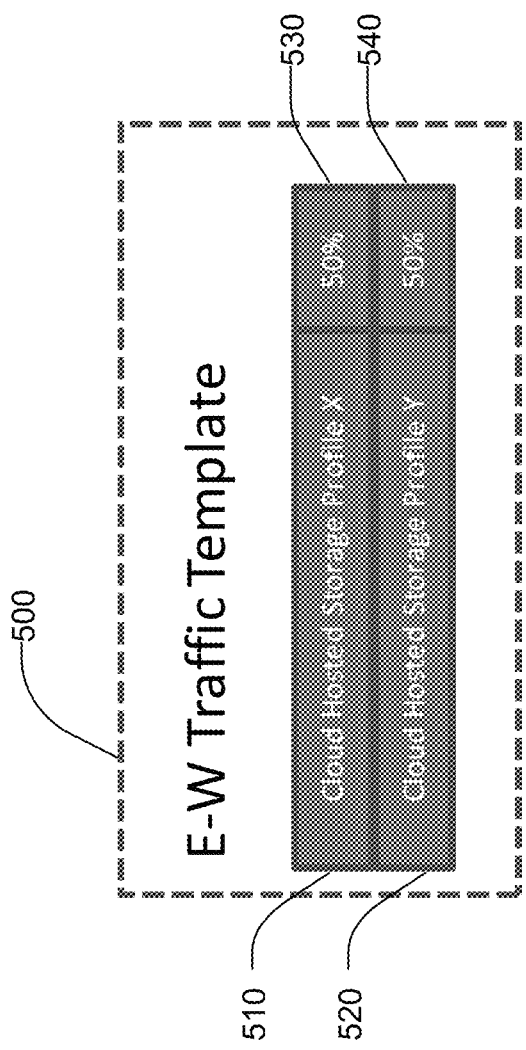
FIG. 5 is an example of a traffic template.
Figure 6:
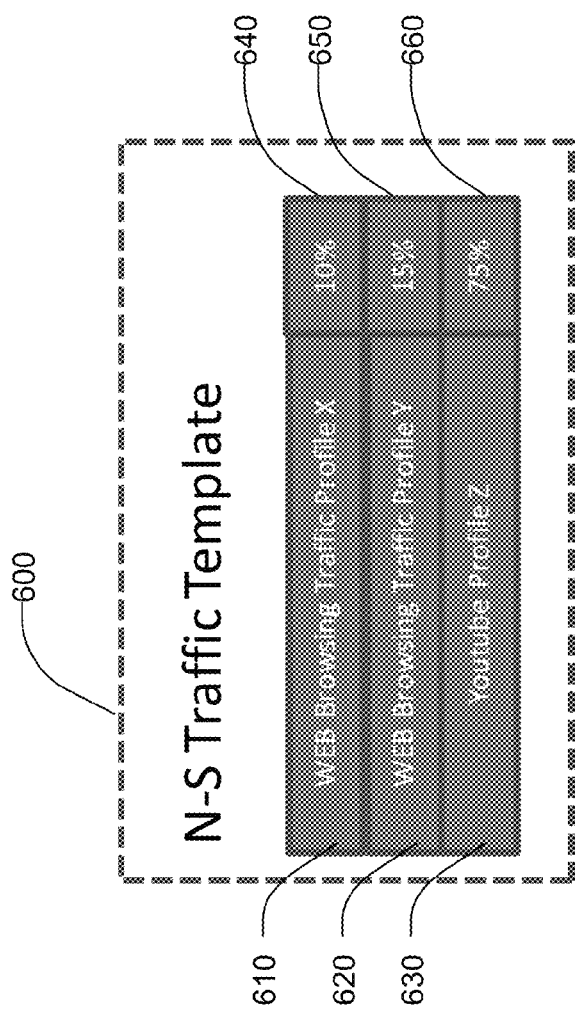
FIG. 6 is an example of a traffic template.

FIGS. 5 and 6 are examples of traffic templates. FIG. 5 shows a traffic template 500 comprising two traffic profiles associated with an E-W communication axis. The traffic template 500 comprises network traffic for server to server communications. The traffic template 500 comprises a cloud hosted storage profile X 510 having a relative weight of 50% 530. The cloud hosted storage profile defines the rules and parameters required to generate a sequence of packets that emulate sending and storing data in a cloud hosted environment. The relative weight defines the overall traffic configuration for the traffic template. That is, the relative weight defines the percentage the traffic profile comprises of the overall traffic of that traffic template. The relative weights define the overall traffic configuration for the traffic template. The traffic template 500 also comprises a cloud hosted storage profile Y 520 having a relative weight of 50% 540. Traffic template 500 will comprise both cloud hosted storage profile X and cloud hosted storage profile Y having 50% each of the overall traffic configuration for the template.

FIG. 6 shows a traffic template 600 comprising two traffic profiles associated with a N-S communication axis. The traffic template 600 comprises three network profiles all with different relative weights. The first traffic profile, 610, is a web browsing traffic profile X. The web browsing traffic profile X has a relative weight 640 of 10%. The second traffic profile, 620, is a web browsing traffic profile Y. The web browsing traffic profile Y has a relative weight 650 of 15%. Finally, the third traffic profile, 630, is a YouTube profile Z. The third traffic profile 630 has a relative weight 660 of 75%. Therefore, traffic profile 610 comprises 10% of the traffic for traffic template 600, traffic profile comprises 15% of the traffic for traffic template 600 and traffic profile 630 comprises 75% of the traffic for traffic template 600.

Figure 7:
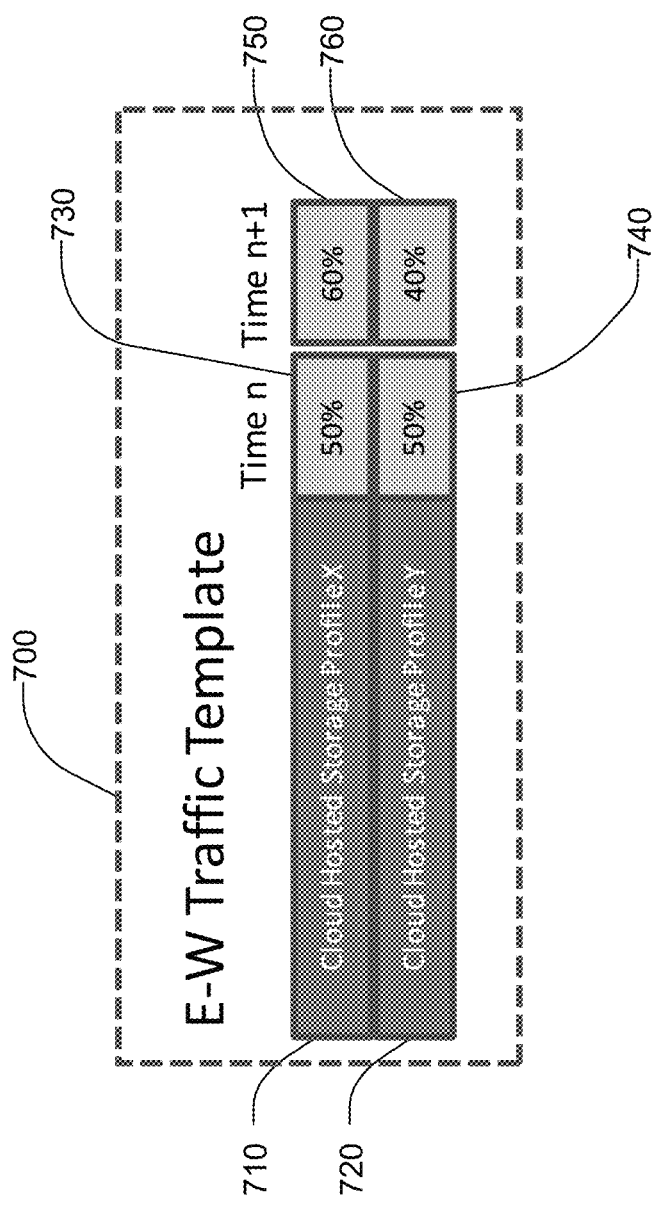
FIG. 7 is an example of a traffic template.
Figure 8:
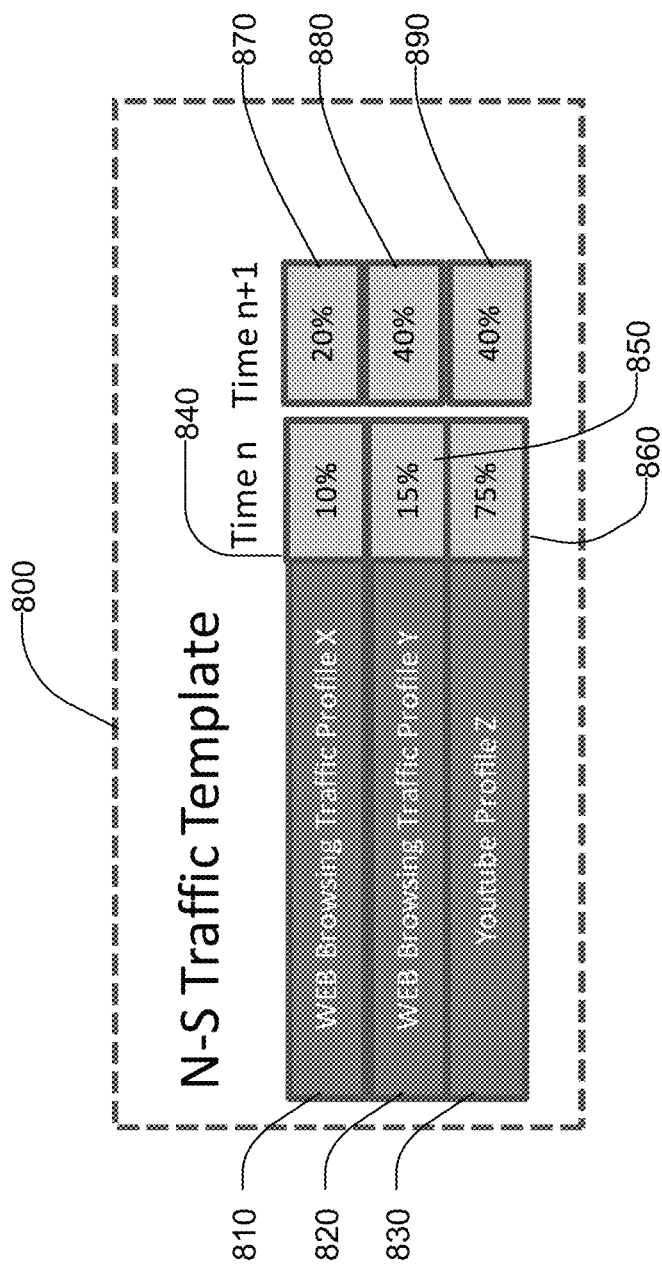
FIG. 8 is an example of a traffic template.

FIGS. 7 and 8 show examples of an adjustment of a traffic template. FIG. 7 shows traffic template 700, associated with an E-W communication axis, comprising the same two traffic profiles as shown in traffic template 500. Specifically, traffic template 700 comprises cloud hosted storage profile X 710 and cloud hosted storage profile Y. At time n, these two profiles have relative weights of 50% each. However, a test administrator can modify the relative weights for each of the profiles dynamically after the test has started. That is, at time n+1, or after the test has started, a test administrator can modify the weight as shown at time n+1. Specifically, at time n+1, cloud hosted storage profile X 710 can be modified to have a relative weight 750 of 60%. Similarly, at time n+1, cloud hosted storage profile Y 720 can be modified to have a relative weight 760 of 40%.

FIG. 8 shows traffic template 800, associated with an N-S communication axis, comprising the same three traffic profiles as shown in traffic template 600. Specifically, traffic template 800 comprises web browsing traffic profile X 810, web browsing traffic profile Y 820, and a YouTube traffic profile Z 830. At time n, traffic profile 810 has a relative weight of 10%, traffic profile 820 has a relative weight of 15% and traffic profile 830 has a relative weight of 75%. However, a test administrator can modify the relative weights dynamically once the test has started as seen at time n+1. As seen, a test administrator can therefore modify traffic profile 810 to have a relative weight 870 of 20%, traffic profile 820 can be modified to have a relative weight 880 of 40% and traffic profile 830 can be modified to have a relative weight 890 of 40%. These dynamic modifications will alter the overall traffic configuration of traffic template 800.

Figure 9:
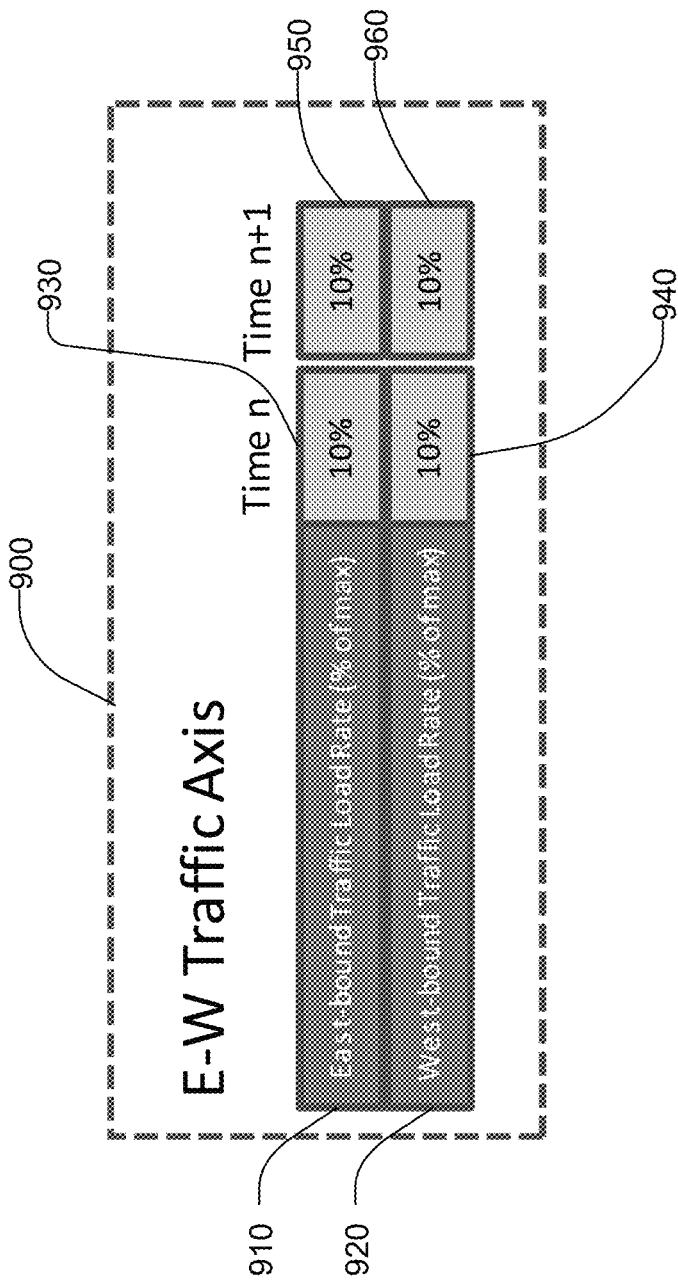
FIG. 9 is an example of a traffic template.
Figure 10:
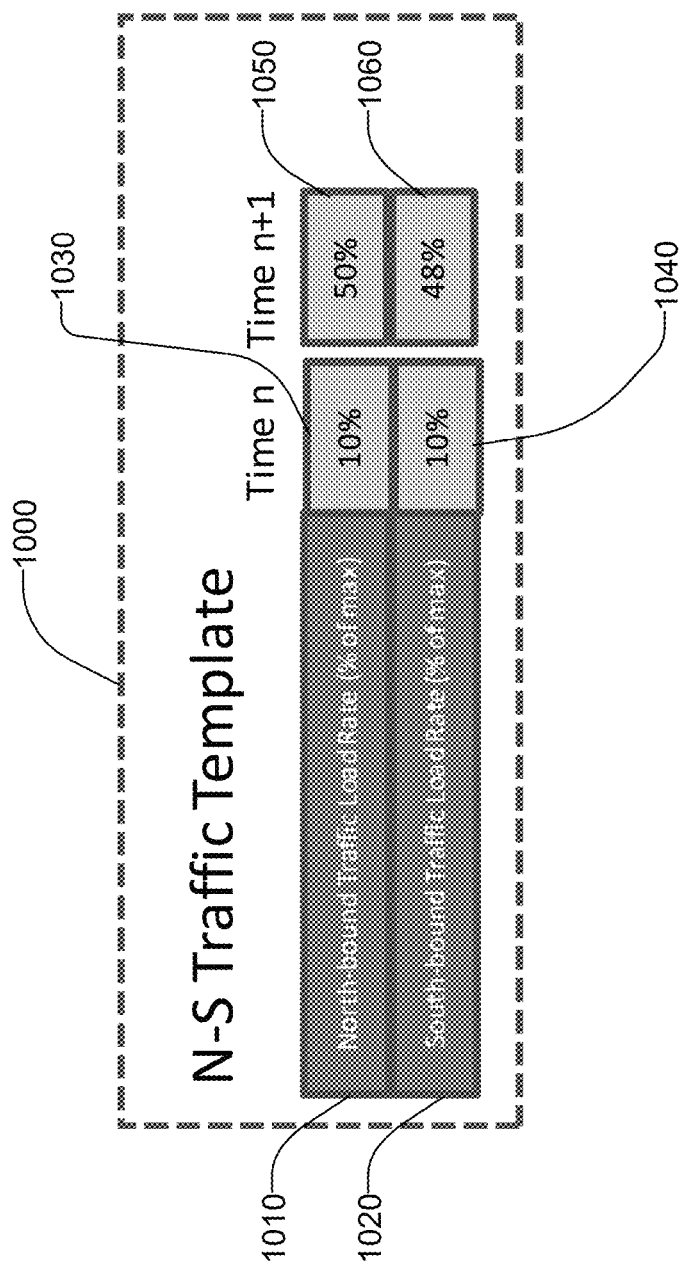
FIG. 10 is an example of a traffic template.

FIGS. 9 and 10 are examples of traffic templates in which the traffic load rates are adjusted dynamically. FIG. 9 shows traffic template 900, associated with an E-W communication axis, having load rates for east-bound traffic and west-bound traffic. In FIG. 9, a test administrator can dynamically adjust the traffic load rate on an E-W communication axis and the user can alter the traffic load rate specific to a certain direction. Specifically, a test administrator can set the east-bound traffic load rate at time n to 10%. At time n+1, a test administrator can dynamically adjust the east-bound traffic load rate. Load rate may be, for example, stated in % max bit rate, % max messages per second, or any other relevant loading rate metric or measure. In this example, the load rate remains the same, however a test administrator could alter that from 10% which was set at time n. Similarly, a test administrator can alter the west-bound traffic load rate dynamically. In this example, the west-bound traffic load rate is set at 10%. At time n+1, the test administrator maintains the west-bound traffic load rate at 10%.

FIG. 10 shows a dynamic adjustment of a traffic load rate on a N-S communication axis. At time n, the north-bound traffic load rate is set at 10%. At time n+1, a test administrator can dynamically alter the north-bound traffic load rate to 50%. Similarly, at time n, the south-bound traffic load rate is set at 10%. However, a test administrator can dynamically alter that to 48% at time n+1.

The dynamic adjustment of the relative weights for the profiles or the traffic load rates can occur manually or can occur as a result of a test administrator utilizing time-based, conditional rules. For example, in FIG. 10, a test may be operated with a first North-bound load rate and a first South-bound load rate at time n. At time n+1, a test administrator may evaluate one or more specified criteria, such as whether the packet loss is greater than the packet loss threshold value. Based on the result of the test, the test administrator can conditionally adjust the traffic load rate or the relative weight based on the response to the programmed criteria.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a blade or other card with a processor in a network testing system. The network testing software may be stored on a volatile or nonvolatile memory device or storage medium included in or on and/or coupled with a computing device, a network testing system, a network card, or other card. The methods may be implemented on one or more network cards 220 in a single network testing system or may be implemented on one or more network cards 220 on each of two or more network testing systems.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for testing a network device, the method comprising: defining a traffic profile wherein the traffic profile defines a type of network traffic comprising a sequence of packets and wherein the traffic profile associates the network traffic with a communication axis; defining a traffic template wherein the traffic template comprises one or more traffic profiles, a relative weight to identify a weight of the profile within an overall traffic configuration, and a load rate that defines the maximum amount of packets that can be transmitted at a certain time generating network traffic based on the traffic template; and transmitting the network traffic to a device under test wherein the relative weight of the traffic profile may be changed dynamically in real-time.

2. The method of claim 1, wherein the profile direction is one of a north-south communications axis representing client-server communications traffic and an east-west communications axis representing server-server communication traffic.

3. The method of claim 1 wherein the type of network traffic of a first traffic profile of a traffic template is web browsing traffic.

4. The method of claim 1 wherein the relative weight of each of the traffic profiles of the traffic template sum to 100%.

5. A method for testing a network device, the method comprising: recording a set of packets as they are transmitted and received on a communication axis; defining a first traffic profile based on the recorded set of packets; defining a traffic template wherein the traffic template comprises the first traffic profile and a second traffic profile, a relative weight to identify a weight of the profile within an overall traffic configuration, and a load rate that defines the maximum amount of packets that can be transmitted at a certain time generating network traffic based on the traffic template, and transmitting the network traffic to a device under test wherein the relative weight of the traffic profile may be changed dynamically in real-time.

6. The method of claim 5, wherein the communication axis is one of a north-south communications axis representing client-server communications traffic and an east-west communications axis representing server-server communication traffic.

7. The method of claim 5 wherein the type of network traffic of a first traffic profile of a traffic template is web browsing traffic.

8. The method of claim 5 wherein the relative weight of each of the traffic profiles of the traffic template sum to 100%.

* * * * *